United States Patent Office 3,464,851
Patented Sept. 2, 1969

3,464,851
STABILIZED POLYURETHANES
John W. Cahill, Somerset, Mass., assignor to Globe Manufacturing Company, Fall River, Mass., a corporation of Massachusetts
No Drawing. Continuation-in-part of application Ser. No. 621,453, Mar. 8, 1967. This application Feb. 19, 1968, Ser. No. 706,609
Int. Cl. B44d 1/22; C08j 1/40
U.S. Cl. 117—138.8   8 Claims

ABSTRACT OF THE DISCLOSURE

Polyurethanes made from toluene diisocyanate and a polyester or polyether are stabilized by the use of an allyl substituted thiourea, preferably cyclohexane bis (methyl monoallylthiourea), or xylyl bis (allylthiourea).

This application is a continuation-in-part of application Ser. No. 621,453 filed Mar. 8, 1967, and now abandoned.

This invention relates to the stabilization of polyurethanes.

Nitric oxide (NO) is present to a small amount in air. Its presence causes color instability in polyurethanes. Ultraviolet light also deleteriously affects the color stability of polyurethanes.

It is an object of the present invention to improve the ultraviolet light stability of polyurethanes.

Another object is to improve the color stability of polyurethanes against nitric oxide fumes or vapors.

Still further objects and the entire scope of applicability of the present invention will become apparent from the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by employing cyclohexane bis (methyl monoallylthiourea) having the formula

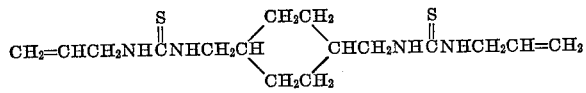

as a stabilizer for polyurethanes prepared from polyesters or polyethers and toluene diisocyanate. It is critical that the isocyanate employed be toluene diisocyanate since the cyclohexane bis (methyl monoallylthiourea) does not satisfactorily stabilize polyurethanes made from other polyisocyanates such as methylene bis (4 phenylisocyanate) for example. Meta xylylene bis (allylthiourea) having the formula

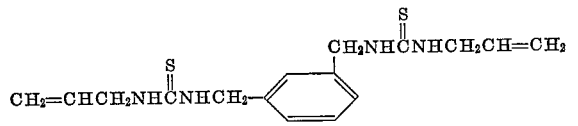

has also been found to be effective as a stabilizer for the polyurethanes. Para xylylene bis (allylthiourea) is much less effective as a stabilizer although a mixture of 70% meta and 30% para xylylene bis (allylthiourea) is an excellent stabilizer.

While cyclohexane bis (methyl monoallylthiourea) and m-xylyl bis (allyl-thiourea) have been found to be by far the best stabilizers some improvement in stability has been observed with N-allyl N'-isobutyl thiourea and with the nonane bis (allylthiourea) having the formula

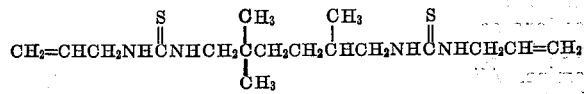

The toluene diisocyanate can be either the 2,4-isomer or the 2,6-isomer or mixtures thereof e.g. 65% 2,4 and 35%, 2,6 or 80% 2,4 and 20% 2,6.

The cyclohexane bis (methyl monoallylthiourea) and other allylthioureas are effective to color stabilize the polyurethanes against ultraviolet light and against the effects of nitric oxide fumes. They are particularly effective when the polyurethane is in the form of fibers, e.g., as individual filaments or in the form of woven or nonwoven fabrics but they can also be employed to stabilize the polyurethane in other forms.

The most convenient way of applying the stabilizer to the polyurethane is in the form of an aqueous dispersion or as an organic solution. Thus the stabilizer can be applied to polyurethane fibers or fabric as an 0.01 to 1% dispersion, e.g. a 0.1% dispersion in water or an 0.01 to 1% solution, e.g. a 0.1% solution in acetone. The stabilizer can be employed in an amount as little as 0.05% by weight of the polyurethane or it can be employed in an amount of 2%, 5% or even more based on the polyurethane. Normally there is not sufficient advantage in using more than 1% of the stabilizer to justify the increase in cost.

Unless otherwise indicated all parts and percentages are by weight.

The fibers which are stabilized are preferably prepared according to Cahill et al. application 365,082 filed May 5, 1964 although the stabilization with the cyclohexane bis (methyl monoallylthiourea) and other allyl thioureas can be employed with polyurethane fibers prepared by other procedures such as those disclosed in Gregg Patent 3,111,369, Murphy Patent 3,165,566, Harper Patent 3,174,949, Cacella Patent 3,115,384, Kohrn Patents 2,953,839 and 3,009,762 and Hostettler Patent 3,186,971. Regardless of how the fibers are prepared however, as pointed out above it is essential that the polyisocyanate be toluene diisocyanate.

The polyurethane fibers are known generally as spandex fibers.

As previously indicated the polyurethanes are preferably prepared as set forth in Cahill application 365,082. As set forth in that application a liquid polyurethane prepolymer is extruded into a bath of a polyamine in an organic solvent. With solvents such as alcohols, nitriles and substituted amides which form complexes with amines there is normally employed 5 to 10 normal solutions of the polyamine whereas with non-complexing organic solvents such as aromatic hydrocarbons, with or without aliphatic hydrocarbon diluents there is employed not over 3 normal and usually between 0.05 and 1.5 normal solutions of the polyamine.

As suitable amines there can be used ethylene diamine, propylene diamine, trimethylene diamine, hexamethylene diamine, diethylene triamine, triethylene tetramine, tetraethylene pentamine, 1,4-diaminocyclohexane, 3,3'-diamino-dipropyl ether, diamino dibutyl sulfide, m-xylylene diamine, piperazine, N-aminoethyl piperazine, N,N'-dimethyl ethylene diamine, 2-methyl piperazine, bis tallow amines made by reducing the diamides of dimerized unsaturated fatty acids, e.g., the diamine of dimerized linseed oil fatty acids.

As the organic solvents there can be used ethylene glycol, 1,4-butanediol, 1,3-butylene glycol, propylene glycol, glycerine, hexanetriol, methyl alcohol, ethyl alcohol, isopropyl alcohol, butyl alcohol, amyl alcohol, acetonitrile, propionitrile, dimethyl formamide, diethyl formamide, dimethyl acetamide, aromatic hydrocarbons, e.g., benzene, toluene, o-xylene, p-xylene, m-xylene, mixed xylenes, ethyl benzene, 1,3,5-trimethyl benzene, propyl benzene, isopropyl benzene and butyl benzene, and aromatic naphtha. Any solvent or solvent blend can be used as long as the polyamine is miscible and the concentration is adjusted to yield the desired amount of available amine. Aliphatic hydrocarbons, e.g., hexane, pentane, heptane, octane, kerosene, mineral oils, VM and P naphtha, cyclohexane can be used in combination with other solvents such as alcohols or aromatic hydrocarbons.

The use of 4% of ethylene diamine in toluene or xylene is approximately equivalent to the use of 20% of ethylene diamine in isopropanol.

The material which is extruded into the polyamine reaction bath is urethane prepolymer. The prepolymer has a molecular weight of 500 to 5000, preferably between 1000 and 4000. The urethane prepolymers are formed by reacting an excess of toluene diisocyanate with a polyol. The polyol can be (1) a polyester from either dicarboxylic acids and glycols or by ring opening of lactones, (2) polyethers, (3) polyester-ethers, (4) castor oil products or (5) any other material containing two or more alcoholic hydroxyl groups and a hydroxyl number between 20 and 225. In order to lower the viscosity and aid in the spinning of the prepolymer a small amount of conventional polyurethane solvent, e.g., 1 to 20%, preferably 5%, can be added prior to spinning. Typical solvents include ketones, such as acetone, methyl ethyl ketone, and methyl isobutyl ketone substituted amides, e.g., dimethyl formamide and dimethyl acetamide, carbonates, e.g., ethylene carbonate and propylene carbonate, sulfoxides, e.g., dimethyl sulfoxide, aromatic hydrocarbons, and esters.

As polymeric materials having terminal alcoholic hydroxyl groups suitable for making prepolymers with organic polyisocyanates there can be used chain extended polyesters made from a glycol, preferably a mixture of ethylene and propylene glycols, and a saturated organic dicarboxylic acid, preferably adipic acid. Usually, the glycol contains 2 to 20 carbon atoms. Typical examples of such glycols include ethylene glycol, propylene glycol, trimethylene glycol, 1-4-butylene glycol, 1,6-hexanediol, 1,4-butenediol, neopentyl glycol, diethylene glycol, thiodiglycol, etc. The acid usually contains 4 to 20 carbon atoms. Typical examples include succinic acid, maleic acid, dihydromucconic acid, thiodipropionic acid, adipic acid, methyl adipic acid, glutaric acid, dimerized linoleic acid, sebacic acid, suberic acid, phthalic acid, and terephthalic acid. Hydroxycarboxylic acids or their lactones can be used, e.g., epsilon caprolactone or more preferably a copolymer of epsilon caprolactone with epsilon methyl epsilon caprolactone, e.g. 75% epsilon caprolactone and 25% epsilon methyl epsilon caprolactone in forming the polyesters. The preparation of polyesters from such lactones is shown in Hostettler Patent 3,186,971. As stated, mixtures of various dibasic acids and glycols can be used to form mixed esters.

An excess of the glycol over the acid is used in preparing the polyesters so that the resulting polyester contains terminal hydroxyl groups. Usually such an amount of glycol is used as to give a polyester having a hydroxyl number of 20 to 225 and preferably 30 to 75, and a low acid value, e.g., less than 6 and preferably less than 1. The molecular weight of the polyester usually ranges from 500 to 5000 and preferably 1500 to 4000. In general, the most suitable polyesters having melting point levels of 90° C. or lower and preferably not over 60° C. Less suitably, natural polyesters can be used, e.g., castor oil, as well as blown drying oils, such as blow tung oil, linseed oil and soya oil.

Some functional branching helps. If this is not present in the polyester it is introduced through allophanate formation. Only a small amount is needed, i.e., a functionality above 2.1 but usually not over 2.5.

Other examples of suitable polyesters for use in preparing the prepolymer are polyethylene adipate, polyethylene adipate-phthalate and polyneopentyl sebacate. Small amounts of trialcohols such as trimethylolpropane or trimethylolethane may be included in preparing the glycoldicarboxylic acid polyesters and such modified forms of polyester are included within the term polyester as used herein.

As an alternative to the polyesters there may be used for reaction with the polyisocyanate one or more elastomer-yielding polyethers. Such polyethers are typically anhydrous chain extended polyethers possessing ether linkage separated by hydrocarbon chains either alkyl or aryl in nature. The ether should also contain terminal groups reactive to isocyanate, such as alcoholic hydroxyl groups. Such polyethers may be linear or branched. Usually, the polyethers are chiefly linear with a melting point of not over 90° C., preferably not over 60° C. The molecular weight may range from 500 to 5000, hydroxyl number of 225 to 22, but preferably is within the range of 750 to 3500 (hydroxyl number of 150 to 32). Preferred polyethers have the formula $H(OR)_nOH$ where R is a lower alkylene group (2 to 6 carbon atoms) and $n$ is an integer so that the molecular weight falls within the range specified. Examples of polyethers are polyethylene glycol, polypropylene glycol, mixed polyethylene glycol-polypropylene glycol, polytetramethylene glycol (e.g., of 1000 molecular weight).

A portion of the polyester or polyether can be replaced by a tris polypropylene glycol phosphite such as tris (dipropylene glycol) phosphite or tris (polypropylene glycol 2025) phosphite as shown in Friedman United States Patent No. 3,009,939. The phosphite not only serves as a reactant but also imparts improved heat stability to the polyurethane as well as improved dyeing properties. There can be used bis (propylene glycol) hydroxypropoxypropane phosphonate in place of the phosphite to give improved heat stability.

Polyethers not only can be used in place of the polyesters but can be used in conjunction therewith. Examples of such compounds are polydiethylene glycol adipate and polytriethylene glycol adipate. Further examples of polyesters and polyethers which are suitable are set forth in Kohrn United States Patent No. 2,953,839 and the patents cited therein in column 2, lines 56–68.

The polyester or polyether (including polyether-ester) is reacted or "capped" with a diisocyanate using a considerably molar excess, commonly from a 20 to a 250%, and preferably from a 50 to a 200%, molar excess of the amount of diisocyanate required to react with all of the alcoholic hydroxy groups furnished by the polyester or polyether. The reaction is frequently effected by mixing the polyester or polyether with the diisocyanate either at room temperature or at a moderately elevated temperature, e.g., 70 to 150° C. to form an uncured liquid prepolymer which is soluble in methyl ethyl ketone. The prepolymer is essentially a linear polyurethane having terminal isocyanate groups. The reaction is preferably carried out at 90 to 100° C.

Threads can be made as set forth in Cahill application 365,082 by placing the liquid prepolymer in a supply tank and pumping to a spinnerette immersed in a reaction bath of a polyamine in an organic solvent. Thus 100 gauge thread can be produced at 200 ft./min. take-up speed. The extruded liquid is converted almost immediately to a thread in the reaction bath and then is passed into an oven to remove solvent and excess polyamine and to advance the cure of the thread.

Curing can be done at 65 to 205° C., usually 80 to 150° C. for a time of 30 minutes to 30 hours, usually 1 to 3 hours at 90 to 120° C. Lower temperatures can be used if longer cure times are employed. At 175° C. a time of 30 seconds is convenient and practical. It is normally not necessary to cure the thread if the solvent and excess diamine are removed rapidly at an elevated temperature, e.g., 175° C. to 220° C., for 30 seconds to a minute.

The cured threads can be stretched 10%, 50%, 100%, 200% or 400% or as high as 700% of their original length by running a second spool 10, 50, 100, 200, 400 or 700% faster than a first spool.

EXAMPLE 1

A polyester resin of molecular weight 3700, hydroxyl number of about 35 and an acid number of 0.8 from ethylene glycol, propylene glycol and adipic acid was mixed at a temperature of 90° C. for 1 hour with 17 parts (an excess) of 2,4-toluene diisocyanate. The mixture was then heated for 1 hour at 120° C. A reaction occurred between the hydroxyl groups of the polyester and the diisocyanate groups to form a capped polymer intermediate characterized by the presence of unreacted isocyanate groups. This intermediate was a viscous liquid urethane prepolymer which was soluble in the common organic solvents for polyurethanes, e.g., acetone.

EXAMPLE 2

Polycaprolactone having a hydroxyl number of 52 was heated with 24 parts of a 2,4-toluene diisocyanate at 90° C. for 1 hour and then at 120° C. for 1 hour.

EXAMPLE 3

100 parts of polyethylene-polypropylene adipate having a hydoxyl number of 36 and a functionality of 2.3 were heated at 90° C. for 2 hours with 17 parts of 2,4-toluene diisocyanate. The functionality of the polyethylene-propylene adipate was raised from the normal 2 to 2.3 by adding a small amount of trimethylpropane to the starting ethylene glycol, propylene glycol and adipic acid.

EXAMPLE 4

100 parts of the same polyethylene-propylene adipate having a hydroxyl number of 36 and a functionality of 2.3 employed in Example 3 were heated at 90° C. for 2 hours with a mixture of 13 parts of 2,4-toluene diisocyanate and 5 parts of methyl isobutyl ketone. The ketone was employed to reduce the viscosity of the prepolymer.

EXAMPLE 5

2 moles of polypropylene glycol (molecular weight 2000), 2 moles of trimethylolpropane and 8 moles of 2,4-toluene diisocyanate were heated for 2 hours at 90° C. Then 2 moles of 2,4-toluene diisocyanate and 1 mole of polypropylene glycol (molecular weight 2000) were added and the mixture heated for 2 more hours at 90° C.

The materials of Examples 1–5 were then spun into the polyamine dissolved in an organic solvent. The spinning bath can be at 5 to 100° C. The oven cure can be at temperatures up to 175° C. or higher, e.g. 220° C.

In the following examples the fibers were prepared with a spinning bath which was at room temperature and had a length of one foot. The extruder oven in Examples 6 to 11 was at 116° C. and post curing was done at 116° C. for 2 hours.

EXAMPLE 6

The polyurethane prepolymer prepared in Example 1 was extruded into a bath containing 20% of ethylene diamine in isopropanol. After the curing the properties of the thread were

| | | |
|---|---|---|
| Tensile strength | p.s.i | 9000 |
| Ultimate elongation | percent | 625 |
| 300% modulus | p.s.i | 1500 |
| Elastic recovery | percent | 90 |

EXAMPLE 7

The polyurethane prepolymer of Example 2 was extruded into a bath containing 4% of ethylene diamine in toluene. After the curing the properties of the thread were

| | | |
|---|---|---|
| Tensile strength | p.s.i | 10,500 |
| Ultimate elongation | percent | 575 |
| 300% modulus | p.s.i | 1,300 |
| Elastic recovery | percent | 88 |

EXAMPLE 8

The polyurethane prepolymer of Example 3 was extruded into a bath containing 33% hexamethylene diamine in isopropanol. After curing the thread had the following properties

| | | |
|---|---|---|
| Tensile strength | p.s.i | 6500 |
| Ultimate elongation | percent | 700 |
| 300% modulus | p.s.i | 600 |
| Elastic recovery | percent | 88 |

EXAMPLE 9

The polyurethane prepolymer of Example 4 was extruded into a bath containing 4% of ethylene diamine in benzene. After curing the fiber had the following properties

| | | |
|---|---|---|
| Tensile strength | p.s.i | 10,000 |
| Ultimate elongation | percent | 725 |
| 300% modulus | p.s.i | 800 |
| Elastic recovery | percent | 94 |

EXAMPLE 10

The polyurethane prepolymer of Example 3 was extruded into a bath containing 5% of piperazine in toluene. After curing the thread had the following properties

| | | |
|---|---|---|
| Tensile strength | p.s.i | 4700 |
| Ultimate elongation | percent | 325 |

EXAMPLE 11

The polyurethane prepolymer of Example 5 was extruded into a bath containing 20% of ethylene diamine in isopropanol. After curing the thread had the following properties

| | | |
|---|---|---|
| Tensile strength | p.s.i | 6400 |
| Ultimate elongation | percent | 300 |

The gauge of the thread is determined by the pump output and the take-up speed. These can be varied over a wide range. As indicated in the examples, the take-up speed was about 200 feet per minute for the production of 100 gauge thread.

Various methods can be employed for curing the prepolymers coagulated in an organic solvent bath of polyamine according to the invention. Thus, they can be extruded as a monofilament and cured under water rather than being cured in an air oven, as in the examples. Also, they can be prepared as multifilaments in a bath containing less extender (polyamine) than used for heat cures in air and subsequently cured under water.

Combinations of solvents can also be used in the reaction bath, e.g., a mixture of 60% toluene and 40% isopropanol.

Other additives such as catalysts, surfactants, plasticizers and antioxidants can be incorporated in either the prepolymer or the spinning bath in conventional fashion.

Threads can also be formed by multifilament spinning. In Examples 12–17 threads were formed from a spinnerette having 16 filaments which came together at the surface of the bath. The threads were of 375 gauge, although other gauges of course can be used. In Examples 12–17 the temperature of the curing oven was adjusted to heat the thread to about 175° C. during the stay in the oven of about one minute.

EXAMPLE 12

The polyurethane prepolymer prepared in Example 1 was extruded into a bath containing 20% of ethylene diamine in isopropanol. The resulting thread, after passing through the drying oven, was similar to that of Example 6 except the thread of Example 12 had a little better color, a higher 300% modulus, a higher tensile strength, and a little better elastic recovery.

EXAMPLE 13

The polyurethane prepolymer of Example 2 was extruded into a bath containing 4% of ethylene diamine in toluene. The multifilament thread obtained was similar to that of Example 7 but was improved in the same manner as the thread of Example 12.

EXAMPLE 14

The polyurethane prepolymer of Example 3 was extruded into a bath containing 33% hexamethylene diamine in isopropanol. The multifilament thread obtained was similar to that of Example 8 but was improved in the same manner as the thread of Example 12.

EXAMPLE 15

The polyurethane prepolymer of Example 4 was extruded into a bath containing 4% of ethylene diamine in benzene. The multifilament thread obtained was similar to that of Example 9 but was improved in the same manner as the thread of Example 12.

EXAMPLE 16

The polyurethane prepolymer of Example 5 was extruded into a bath containing 20% of ethylene diamine in isopropanol. The multifilament thread obtained was similar to that of Example 11 but was improved in the same manner as the thread of Example 12.

EXAMPLE 17

The polyurethane prepolymer of Example 4 was extruded into a bath containing 0.9% of piperazine in toluene. The multifilament thread obtained had the following properties

| | | |
|---|---|---|
| Tensile strength | p.s.i. | 10,300 |
| Ultimate elongation | percent | 675 |
| 300% modulus | p.s.i. | 1,000 |
| Elastic recovery | percent | 98 |

EXAMPLE 19

Cured threads prepared according to Example 6 were passed through a 0.1% aqueous dispersion of cyclohexane bis (methyl monoallylthiourea). Approximately 0.1% of the substituted thiourea was picked up based on the weight of the threads. The water was removed by passing through an oven at 100° C. The treated threads had excellent color stability against ultraviolet light and against nitric oxide vapors.

Instead of drying in an oven, air drying can be employed to remove the water although longer drying times are required.

In place of threads a woven cloth made of the threads of Example 6 was treated in the same fashion with a 0.1% aqueous dispersion of the substituted thiourea to pick up 0.1% of the substituted thiourea with similar results.

EXAMPLE 20

Cloth made from cured threads prepared according to Example 7 was passed through a 0.1% aqueous dispersion of cyclohexane bis (methyl monoallylthiourea). Approximately 0.05% of the substituted thiourea was picked up based on the weight of the cloth. The water was removed in a hot air oven to give a stabilized polyurethane cloth.

EXAMPLE 21

Cloth made from cured threads prepared according to Example 8 were passed through a 0.2% solution of cyclohexane bis (methyl monoallylthiourea) in acetone. Approximately 1% of the substituted thiourea was picked up based on the weight of the cloth and the acetone was removed in a warm air oven to give a stabilized polyurethane cloth. In place of acetone there can be employed other volatile solvents in this example e.g. methyl ethyl ketone and methyl isobutyl ketone as well as any other inert organic solvents for the substituted thiourea.

EXAMPLE 22

Cloth made from cured threads prepared according to Example 9 was passed through a 0.1% aqueous dispersion of cyclohexane bis (methyl monoallylthiourea) to pick up 0.05% of the substituted thiourea and dried in a warm oven to obtain a stabilized cloth.

EXAMPLE 23

The procedure of Example 22 was repeated using cloth made from threads prepared according to Example 10 to obtain a stabilized cloth.

EXAMPLE 24

The procedure of Example 22 was repeated using cloth made from threads prepared according to Example 11 to obtain a stabilized cloth.

EXAMPLE 25

The procedure of Example 22 was repeated using cloth made from the multifilament thread prepared in Example 12. A 0.1% pickup of the cyclohexane bis (methyl monoallylthiourea) was obtained. After drying there was obtained a stabilized cloth.

Similar stabilized cloths were obtained using the procedure of Example 22 with cloths made from the threads of Examples 13, 14, 15, 16 and 17.

EXAMPLE 26

The procedure of Example 19 was repeated replacing the aqueous dispersion of cyclohexane bis (methyl monoallylthiourea) by a 0.1% aqueous dispersion of meta xylylene bis (allylthiourea) to obtain threads having excellent color stability against ultraviolet light and nitric oxide vapors.

Similar results were obtained when a woven cloth made of the threads of Example 6 was treated in a similar fashion with a 0.1% aqueous dispersion of 70% meta and 30% para xylylene bis (allylthiourea) to obtain the stabilized thread.

EXAMPLE 27

The procedure of Example 20 was repeated replacing the cyclohexane bis (methyl monoallylthiourea) by meta xylylene bis (allylthiourea) to obtain a stabilized cloth.

EXAMPLE 28

The procedure of Example 20 was repeated but utilizing a 0.1% aqueous dispersion of 70% meta and 30% para xlylene bis (allylthiourea) to obtain the stabilized cloth.

While the polyurethane cloth can be made solely of polyurethane fibers as in the working examples above there can also be employed cloth containing only a fraction of polyurethane fibers, e.g. 1 to 95% and the balance being other fibers such as cotton, nylon, polyethylene terephthalate, acrylonitrile polymer (Orlon), and the like. Thus there can be stabilized with cyclohexane bis (methyl monoallylthiourea) a cloth made from 30% spandex fibers and 70% Dacron (polyethylene terephthalate) fibers where the spandex fibers are prepared as set forth in Example 7.

Many of the stabilizers suitable for use in the present invention have a —CH— grouping in the molecule outside the allyl group.

What is claimed is:

1. A composition comprising a polyurethane fiber which is a reaction product of a polymer selected from the group consisting of polyesters and polyethers having external hydroxyl groups with toluene diisocyanate having applied thereto a stabilizingly effective amount of an allyl substituted thiourea selected from the group consisting of cyclohexane-bis(methyl monoallylthiourea), xylylene-bis(allylthiourea), N-allyl-N'-isobutyl thiourea and nonane-bis(allylthiourea), whereby said polyurethane has improved stability against nitric acid fumes.

2. A composition according to claim 1 wherein the polyurethane is a cured polyurethane.

3. A composition according to claim 2 wherein the polyurethane is in thread form.

4. A composition according to claim 1 wherein the polyurethane is a cured polyurethane and the substituted urea is cyclohexane-bis (methyl monoallylthiourea).

5. A composition according to claim 4 wherein the polyurethane is in the form of an elastomeric thread.

6. A composition according to claim 5 wherein the substituted urea is employed in an amount of from 0.05 to 1% by weight of the polyurethane.

7. A composition according to claim 1 wherein the polyurethane is a cured polyurethane and the substituted thiourea comprises xylylene bis (allylthiourea).

8. A composition according to claim 1 wherein the polyurethane is a cured polyurethane and the substituted thiourea is a mixture of a predominant amount of meta xylylene bis (allylthiourea) and a minor amount of the para isomer.

References Cited
UNITED STATES PATENTS

| | | | |
|---|---|---|---|
| 2,975,146 | 3/1961 | Rogers et al. | 260—2.5 |
| 2,999,839 | 9/1961 | Arvidson et al. | 260—45.9 |
| 3,044,989 | 7/1962 | Shivers | 260—77.5 |
| 3,124,543 | 3/1964 | Fowler et al. | 260—45.9 |
| 3,245,923 | 4/1966 | Manzella et al. | 260—25 |
| 3,024,218 | 3/1962 | Stevens | 260—45.9 |

HOSEA E. TAYLOR, Jr., Primary Examiner

U.S. Cl. X.R.
260—45.9, 45.95